US009462466B2

(12) United States Patent
L'Heureux et al.

(10) Patent No.: US 9,462,466 B2
(45) Date of Patent: Oct. 4, 2016

(54) GATEWAY ROUTER SUPPORTING SESSION HAND-OFF AND CONTENT SHARING AMONG CLIENTS OF A LOCAL AREA NETWORK

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 0 days.

(21) Appl. No.: 13/309,505

(22) Filed: Dec. 1, 2011

(65) Prior Publication Data
US 2014/0254546 A1 Sep. 11, 2014

Related U.S. Application Data

(60) Provisional application No. 61/540,895, filed on Sep. 29, 2011.

(51) Int. Cl.
| | |
|---|---|
| *H04W 12/06* | (2009.01) |
| *H04W 12/08* | (2009.01) |
| *H04L 29/08* | (2006.01) |
| *H04W 84/12* | (2009.01) |

(52) U.S. Cl.
CPC .............. *H04W 12/06* (2013.01); *H04L 67/14* (2013.01); *H04W 12/08* (2013.01); *H04W 84/12* (2013.01)

(58) Field of Classification Search
CPC .................................................. H04L 2209/80
USPC ............... 709/206, 226, 220, 201, 203, 218; 370/400, 331; 705/30
See application file for complete search history.

(56) References Cited

U.S. PATENT DOCUMENTS

| | | | |
|---|---|---|---|
| 6,374,300 B2 | 4/2002 | Masters | |
| 6,725,281 B1 | 4/2004 | Zintel et al. | |
| 6,810,412 B1 | 10/2004 | Chang | |
| 8,347,384 B1 | 1/2013 | Preston | |
| 8,473,967 B2 | 6/2013 | Weiser et al. | |
| 2002/0161884 A1 | 10/2002 | Munger | |
| 2004/0068567 A1* | 4/2004 | Moran | H04L 67/14 709/227 |
| 2005/0080906 A1* | 4/2005 | Pedersen | H04L 63/08 709/228 |
| 2006/0291481 A1* | 12/2006 | Kumar | H04L 29/06027 370/400 |
| 2007/0094490 A1* | 4/2007 | Lohr | H04L 67/14 713/153 |
| 2007/0097976 A1 | 5/2007 | Wood | |
| 2008/0165964 A1 | 7/2008 | Lewis | |
| 2008/0281606 A1 | 11/2008 | Kitts | |
| 2010/0162399 A1 | 6/2010 | Sheleheda | |
| 2011/0161293 A1 | 6/2011 | Vermeulen et al. | |
| 2011/0271289 A1 | 11/2011 | Weiser et al. | |
| 2012/0192258 A1 | 7/2012 | Spencer et al. | |

(Continued)

OTHER PUBLICATIONS

USPTO—Examiner Search Information for pending U.S. Appl. No. 13/431,095, Feb. 28, 2013, unpublished.

(Continued)

*Primary Examiner* — Andrew Lai
*Assistant Examiner* — Jamaal Henson
(74) *Attorney, Agent, or Firm* — Michael J. Andri

(57) ABSTRACT

A gateway router is positioned at a boundary of a local area network and a wide area network. The gateway router supports hand-off among client device and/or user accounts for network communications sessions with a network device of the wide area network. The gateway router further supports content sharing among client devices and/or user accounts via the gateway router over the local area network. Data resources in the form of account information, files, applications, session state information, etc. may be stored at the gateway router to facilitate hand-off and/or content sharing among the clients of the local area network.

20 Claims, 9 Drawing Sheets

(56) References Cited

U.S. PATENT DOCUMENTS

| | | | |
|---|---|---|---|
| 2013/0005488 A1* | 1/2013 | Evans et al. | 463/43 |
| 2013/0046893 A1* | 2/2013 | Hauser | G06F 9/4856 |
| | | | 709/226 |
| 2013/0275228 A1 | 10/2013 | Milazzo | |
| 2014/0025753 A1 | 1/2014 | Gronowski | |

OTHER PUBLICATIONS

USPTO—Office Action for pending U.S. Appl. No. 13/431,095, notification date Feb. 28, 2013, unpublished.

Israel L'Heureux and Mark D. Alleman, Response to USPTO Office Action for pending U.S. Appl. No. 13/431,095, response filed Aug. 26, 2013, unpublished.

Israel L'Heureux and Mark D. Alleman, "Access Control Interfaces for Enhanced Wireless Router", Specification for pending U.S. Appl. No. 13/431,095, filed Mar. 27, 2012, unpublished.

Israel L'Heureux and Mark D. Alleman, "Access Control Interfaces for Enhanced Wireless Router", Drawings for pending U.S. Appl. No. 13/431,095, filed Mar. 27, 2012, unpublished.

USPTO—Search Information for pending U.S. Appl. No. 13/367,556, Oct. 23, 2013, unpublished.

USPTO—Office Action for pending U.S. Appl. No. 13/367,556, notification date Oct. 23, 2013, unpublished.

USPTO—Examiner Search Strategy for pending U.S. Appl. No. 13/367,556, Oct. 23, 2013, unpublished.

Israel L'Heureux and Mark D. Alleman, "Application Programming Interface for Enhanced Wireless Local Area Network Router", Specification for pending U.S. Appl. No. 13/367,556, filed Feb. 7, 2012, unpublished.

Israel L'Heureux and Mark D. Alleman, "Application Programming Interface for Enhanced Wireless Local Area Network Router", Drawings for pending U.S. Appl. No. 13/367,556, filed Feb. 7, 2012, unpublished.

USPTO, Office Action and Search Information for pending U.S. Appl. No. 13/367,556, Jul. 16, 2014, USPTO, United States.

Israel L'Heureux and Mark D. Alleman, Response to USPTO Office Action for pending U.S. Appl. No. 13/431,095, response filed Nov. 26, 2013, unpublished.

USPTO—Notice of Allowance, Examiner's Search, and Search Information for pending U.S. Appl. No. 13/431,095, notification date Dec. 6, 2013, unpublished.

Israel L'Heureux and Mark D. Alleman, Smart Router, Specification for U.S. Appl. No. 13/631,184, filed Sep. 28, 2012, unpublished.

Israel L'Heureux and Mark D. Alleman, Smart Router, Drawings for U.S. Appl. No. 13/631,184, filed Sep. 28, 2012, unpublished.

Israel L'Heureux and Mark D. Alleman, Response to U.S. Appl. No. 13/367,556, filed Mar. 24, 2014, unpublished.

United States Patent and Trademark Office, Office Action for U.S. Appl. No. 13/367,556, Office Communication, Apr. 13, 2015, 13 pages, United States.

United States Patent and Trademark Office, Search Information for U.S. Appl. No. 13/367,556, Office Communication, Apr. 13, 2015, 2 pages, United States.

United States Patent and Trademark Office, Examiner's Search Strategy and Results for U.S. Appl. No. 13/367,556, Office Communication, Apr. 13, 2015, 7 pages, United States.

United States Patent and Trademark Office, Office Action for U.S. Appl. No. 13/631,184, Office Communication, Jun. 3, 2015, 16 pages, United States.

United States Patent and Trademark Office, Search Notes for U.S. Appl. No. 13/631,184, Office Communication, Jun. 3, 2015, 16 pages, United States.

Israel L'Heureux et al., Applicants' Response to Office Action for U.S. Appl. No. 13/631,184, Oct. 5, 2015, 10 pages.

Israel L'Heureux et al., Applicants' Response to Office Action for U.S. Appl. No. 13/367,556, Sep. 14, 2015, 31 pages.

* cited by examiner

GATEWAY ROUTER SUPPORTING SESSION HAND-OFF AND CONTENT SHARING AMONG CLIENTS OF A LOCAL AREA NETWORK

CROSS-REFERENCE TO RELATED APPLICATION

The present application claims priority to U.S. Provisional Patent Application Ser. No. 61/540,895, titled SMART ROUTER, filed Sep. 29, 2011, the entire contents of which are incorporated herein by reference in their entirety for all purposes.

BACKGROUND

On-premises wireless routers provide wireless local area network (LAN) access to client devices in both home and business environments. These wireless routers are typically connected to a wide area network (WAN) such as the Internet via a high capacity wired or wireless communications link to provide client devices of the LAN with high-speed access to network resources of the WAN. These wireless routers serve as gateways or access points for multiple client devices to concurrently access wide area networks.

SUMMARY

A gateway router supporting session hand-off and content exchange among clients of a LAN is disclosed. The gateway router is positioned at a boundary between the LAN and a WAN. A network communications session is established by the gateway router for a first client device of the LAN with a network device of a WAN. The gateway router associates the first client device with a client identity, obtains state information for the network communications session for the first client device, and stores the state information for the network communications session in a profile of the client identity.

The gateway router receives a request to associate a second client device with the client identity through permissions or as a client device member of the client identity. The gateway router associates the second client device with the client identity responsive to the request. The gateway router establishes continuation of the network communications session on the second client device with the network device via the gateway router based, at least in part, on the state information for the network communications session stored in the profile of the client identity associated with the second client device.

Claimed subject matter, however, is not limited by this summary as other examples may be disclosed by the following written description and associated drawings.

DETAILED DESCRIPTION

A gateway router is described that supports session hand-off and content sharing among clients of a local area network. The gateway router may capture a session state of a user at a first client device to enable the user to continue the session at a second client device. The gateway router further enables content such as files, web links, or other data resources to be shared between client devices. For example, if a user desires to share information with another user of the LAN, the first user can select a graphical user interface on a client device to share information, may navigate the client device to a locally served web interface hosted by the gateway router, or may push a notification to the other user's client device via the gateway router.

Figure 1:
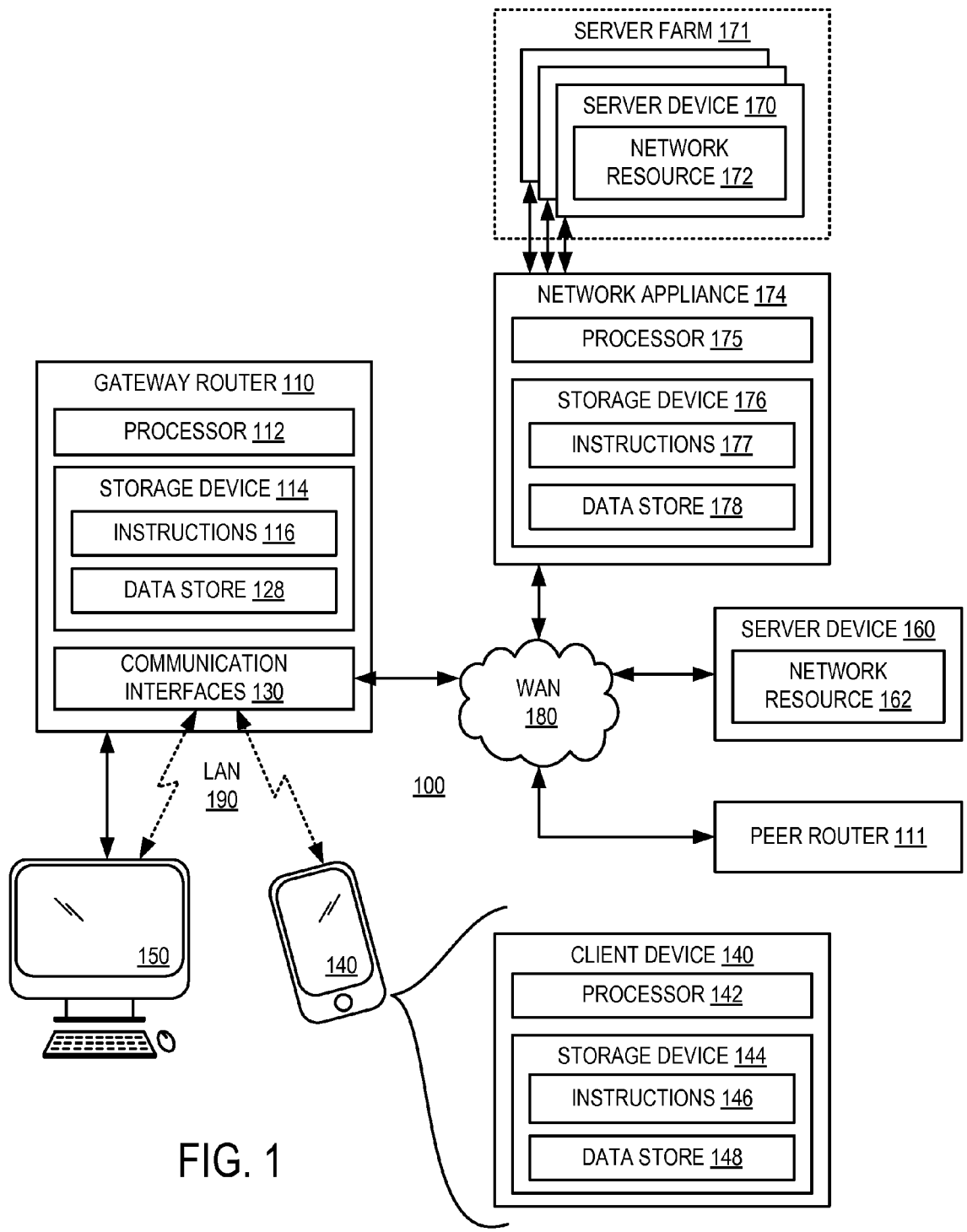
FIG. 1 is a schematic diagram depicting an example computing system according to one disclosed embodiment.

FIG. 1 is a schematic diagram depicting an example computing system 100 according to one disclosed embodiment. Computing system 100 includes a number of computing devices, such as a gateway router 110, one or more client devices (e.g., client devices 140, 150), and one or more network devices (e.g., server devices 160, 170). Gateway router 110 may be positioned along a communications path between a wide area network (WAN) 180 and a local area network (LAN) 190. Gateway router 110 is depicted providing LAN 190 access for client devices 140 and 150, and positioned at a boundary between LAN 190 and various network devices of WAN 180. Gateway router 110 may be implemented as on-premises equipment to provide LAN access to homes, residences, businesses, or other suitable LAN use environments. In some implementations, gateway router 110 may take the form of a private gateway or access point that is owned and/or operated by an owner or operator of the home, residence, business, or use environment in which the gateway router is deployed, in contrast to some public cellular network base stations.

Gateway router 110 includes a communication interface 130 to support wired and/or wireless communications between client devices of LAN 190 and network devices of WAN 180. Communications interface 130 may include one or more wired and/or wireless transceivers, modems, or other suitable electronic devices to facilitate communications with other computing devices. Gateway router 110 may establish communications sessions with client devices of LAN 190, and may route communications between these client devices and network devices of WAN 180. For example, client devices 140 and 150 may request and receive network resources 162 or 172 from server devices 160 or 170 via gateway router 110.

WAN 180 may, for example, take the form of the Internet or a portion thereof. LAN 190 of gateway router 110 may support wired and/or wireless communications between gateway router 110 and client devices 140 and 150. If supported, wired communications within LAN 190 may include Ethernet, powerline Ethernet, or other suitable form of wired communications. LAN 190 may support communications through any suitable type and/or number of wireless protocol standards. For example, LAN 190 may support one or more of the following standards: Wi-Fi (e.g., 802.11), Wi-MAX (e.g., 802.16), LTE (e.g., 3GPP TS 36), UMTS (e.g., 3GPP TS 25), CDMA, Bluetooth, or other suitable wireless protocol.

Gateway router 110 may include a processor 112 to execute instructions 116. Instructions 116 may be held in a storage device 114. Storage device 114 may include or take the form of non-volatile memory. For example, storage device 114 may include or take the form of a hard drive, flash memory device, or other suitable non-volatile storage device. Gateway router 110 may further include volatile memory, which may be used in combination with non-volatile memory of storage device 114 by processor 112 to execute instructions 116.

Instructions 116 may include or take the form of software and/or firmware. For example, instructions 116 may form part of an operating system of gateway router 110, an application program, a software component such as a plug-in, or other suitable instruction set, or combination thereof. In some implementations, functionality provided by gateway router 110 may be supported, at least in part, by associated (e.g., paired) instructions (e.g., software or firmware) executed at a client device of LAN 190 and/or associated instructions (e.g., software or firmware) executed at a network device of WAN 180 (e.g., server device 160 or network appliance 174). As one example, an operating system or application program of client device 140 of LAN 190 may operate in combination with software of gateway router 110. As another example, software of a peer gateway router (e.g., peer gateway router 111) and/or network server device (e.g., server device 160) of WAN 180 may operate in combination with software of gateway router 110.

Storage device 114 of gateway router 110 may include a data store 128. Information may be stored at and/or retrieved from data store 128 by processor 112. Such information may include client identity information or other suitable data resources. An example client identity is described in greater detail with reference to FIG. 2. In contrast to traditional data caches, storage device 114 of gateway router 110 may additionally or alternatively contain short term information such as session data, and/or permanent or long term information such as profile information and data resources or objects such as data dictionaries, or renderable content such as chunks of movie data or other media content. Accordingly, gateway router 110 may include volatile storage such as RAM, non-volatile storage such as FLASH memory, a hard drive, etc.

Client devices 140 and 150 may take the form of a personal computer, mobile computing device, mobile communications device (e.g., Internet enabled phone), television set-top box, or other suitable electronic device. As one example, a client device, such as client device 140, may include a processor 142 to execute instructions 146 held in storage device 144. Instructions 146 may include or take the form of software and/or firmware. For example, instructions 146 may form part of an operating system of client device 140, an application program, a software component such as a plug-in, or other suitable instruction set, or combination thereof. In some implementations, instructions 146 of client device 140 may be configured to operate in coordination with or may be paired with instructions 116 of gateway router 110. Storage device 144 may include a data store 148. Information may be stored at and/or retrieved from data store 148 by processor 142. Some client devices, such as client device 140, may be further configured for WAN access without traversing gateway router 110. As one example, client device 140 may take the form of a mobile communications device (e.g., an Internet enabled phone) that further supports wireless connectivity via a mobile broadband technology such as, for example, 3G or 4G.

Some network devices, such as server device 170, may be one of a plurality of server devices of a server farm 171. Another network device, such as network appliance 174, may be positioned along a communications path between gateway router 110 and one or more server devices of server farm 171. Network appliance 174 may take the form of a load balancer, application delivery controller, or other suitable network device. Network appliance 174 may include a processor 175 to execute instructions 177 held in storage device 176. Instructions 177 may include or take the form of software and/or firmware. For example, instructions 177 may form part of an operating system of network appliance 174, an application program, a software component such as a plug-in, or other suitable instruction set, or combination thereof. Instructions 177 of network appliance 174 may be configured to operate in coordination with or may be paired with instructions 116 of gateway router 110. Storage device 176 may include a data store 178. Information may be stored at and/or retrieved from data store 178 by processor 175.

Computing system 100 may include other gateway routers, such as peer gateway router 111. In some implementations, peer gateway router 111 may be identical to previously described gateway router 110. For example, peer gateway router 110 may provide LAN access for one or more client devices. Peer gateway router 111 may be a nearby/local gateway router for the same or nearby premises as gateway router 110, and may provide LAN 190 in combination with gateway router 110. In this implementation, peer gateway router 111 and gateway router 110 may communicate via LAN 190. Alternatively, peer gateway router 111 may be located at a different premises that is remote from gateway router 110 and may provide a separate LAN to respective client device. In this implementation, peer gateway router 111 may communicate with gateway router 110 via WAN 180.

Figure 2:
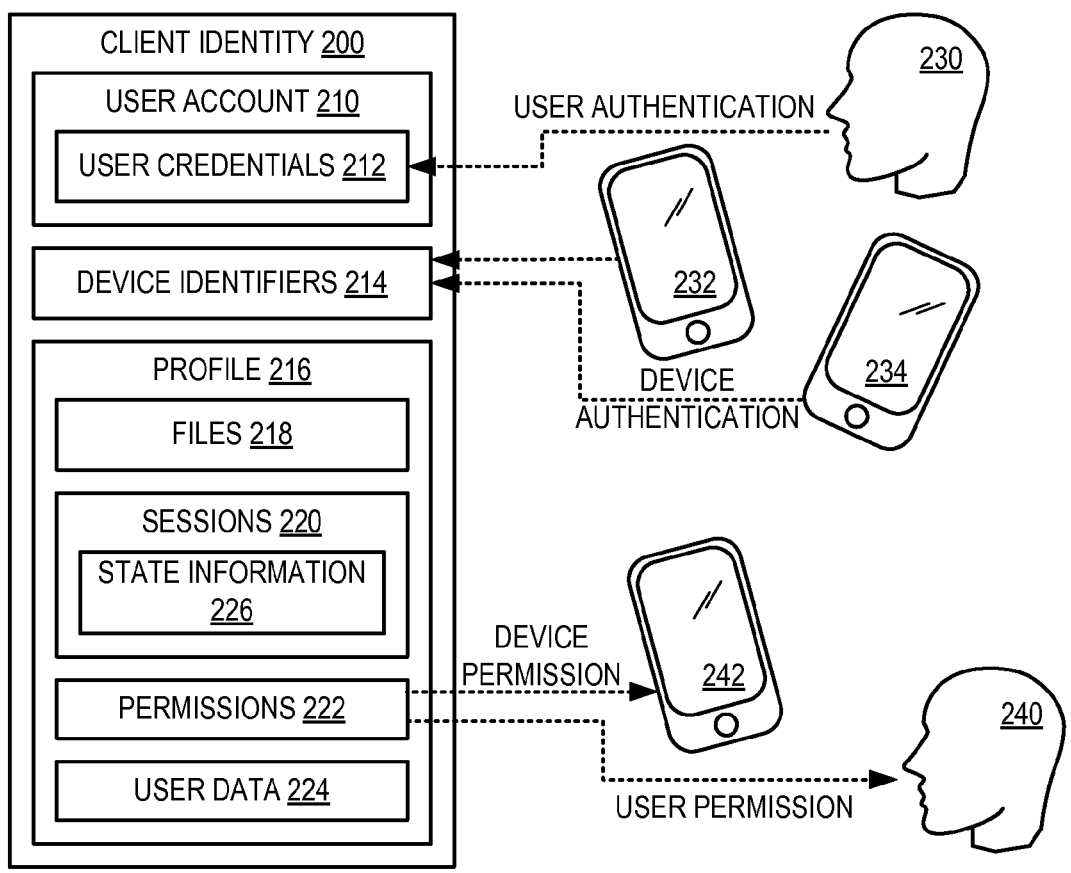
FIG. 2 is a schematic diagram depicting an example client identity according to one disclosed embodiment.

Gateway router 110 may use a client identity to define an association of information that includes a profile, a user account representing a human user, and one or more device identifiers representing respective client devices. FIG. 2 is a schematic diagram depicting an example client identity 200 according to one disclosed embodiment. Client identity 200 or portions thereof may be stored at a data store of a gateway router (e.g., data store 128 of gateway router 110), at a data store of a network service accessible to the gateway router via a communications network (e.g., WAN 180), and/or at a data store of a client device (e.g., data store 148 of client device 140).

Client identity 200 may include a user account 210 having user credentials 212. User credentials 212 may be used by the gateway router to authenticate user account 210 (e.g., via a log-in process). Client identity 200 may include one or more device identifiers 214 corresponding to one or more respective client devices. Device identifiers 214 may include any suitable identifier that enables the gateway router to distinguish client devices from each other. As one example, a device identifier may include a MAC address of a client device. As another example, a device identifier may include or may be based on an identifier of an application program or operating system of a client device. In some implementations, the gateway router may enable users to name client devices, for example, by associating a user assigned name with a device identifier. Because client identity 200 may include two or more device identifiers corresponding to two or more client devices, an individual user may be associated with two or more client devices by client identity 200. Conversely, an individual client device may be associated to two or more users, for example, by the inclusion of a device identifier of the client device in two or more different client identities.

Client identity 200 may include a profile 216. Profile 216 may include or otherwise indicate files 218, sessions 220, permissions 222, and/or user data 224. Files 218 may include one or more of the following: (1) files uploaded to the gateway router by client identity 200, (2) files sent to client identity 200 by another client device or user account of a different client identity, (3) an index of files stored at each of the client devices corresponding to device identifiers 214. User data 224 may include biographical information (e.g., user profile name, user profile picture, user preferences, etc.) and/or other suitable information for a user represented by user account 210.

Sessions 220 may include state information 226 for network communications sessions and/or application program sessions. The state information 226 may be used by the gateway router and/or a client device to continue an existing session at the client device. State information 226 may include, for example, a browser cookie or a web cookie. However, other forms of state information may be supported, including state information for application programs.

Permissions 222 may include one or more permission indicators for client identities, user accounts, device identifiers, etc. Permissions 222 may be referenced by the gateway router to determine whether a particular user represented by a user account or client device represented by a device identity is able to view or access information of profile 216, such as files 218, sessions 220, user data 224, etc. Accordingly, permissions 222 may be defined at the device level, user level, or client identity level which, as previously described, may include an association of a user with one or more client devices. Permissions 222 may also specify whether access has been granted individual data resources such as a particular file of files 218, a particular session of sessions 220, or particular user data of user data 224. As one example, a user 230 represented by user account 210 may permit another user 240 represented by a different client identity to view or access files 218. As another example, user 230 may permit any user to view or access sessions 220 via a particular client device, such as client device 242.

A user may register a user account or a particular client device at the gateway router to create a client identity. FIG. 2 depicts a use scenario where user 230 registers or otherwise creates user account 210 at the gateway router in which user 230 is represented by user credentials 212. User credentials 212 may be used by first user 230 across any computing platform to access information in client identity 200 or services provided by the gateway router. User 230 may also own or operate client devices 232 and 234. Client devices 232 and 234 may be registered with the gateway router in which client devices 232 and 234 are represented by respective device identifiers 214. User 230 may share content of profile 216 between client devices 232 and 234 via the gateway router. User 230 may additionally share the content of profile 216 with other client devices through which first user 230 has provided user credentials 212 to the gateway router.

Information stored in profile 216 such as state information 226 and files 218 may also be shared with user 240 via permissions 222. For example, user 230 may grant permission to user 240 associated with client identity 200 via permissions 222 to share session state and/or files with client devices through which user 240 has been authenticated by the gateway router. For example, user 240 may access session state and/or files of profile 216 from client device 232 owned by first user 230, or from client device 242 that is owned by another user. First user 230 may also grant permission to a client device 242 associated with client identity 200 via permissions 222 to share session state and/or files with any user of client device 242.

Figure 3:
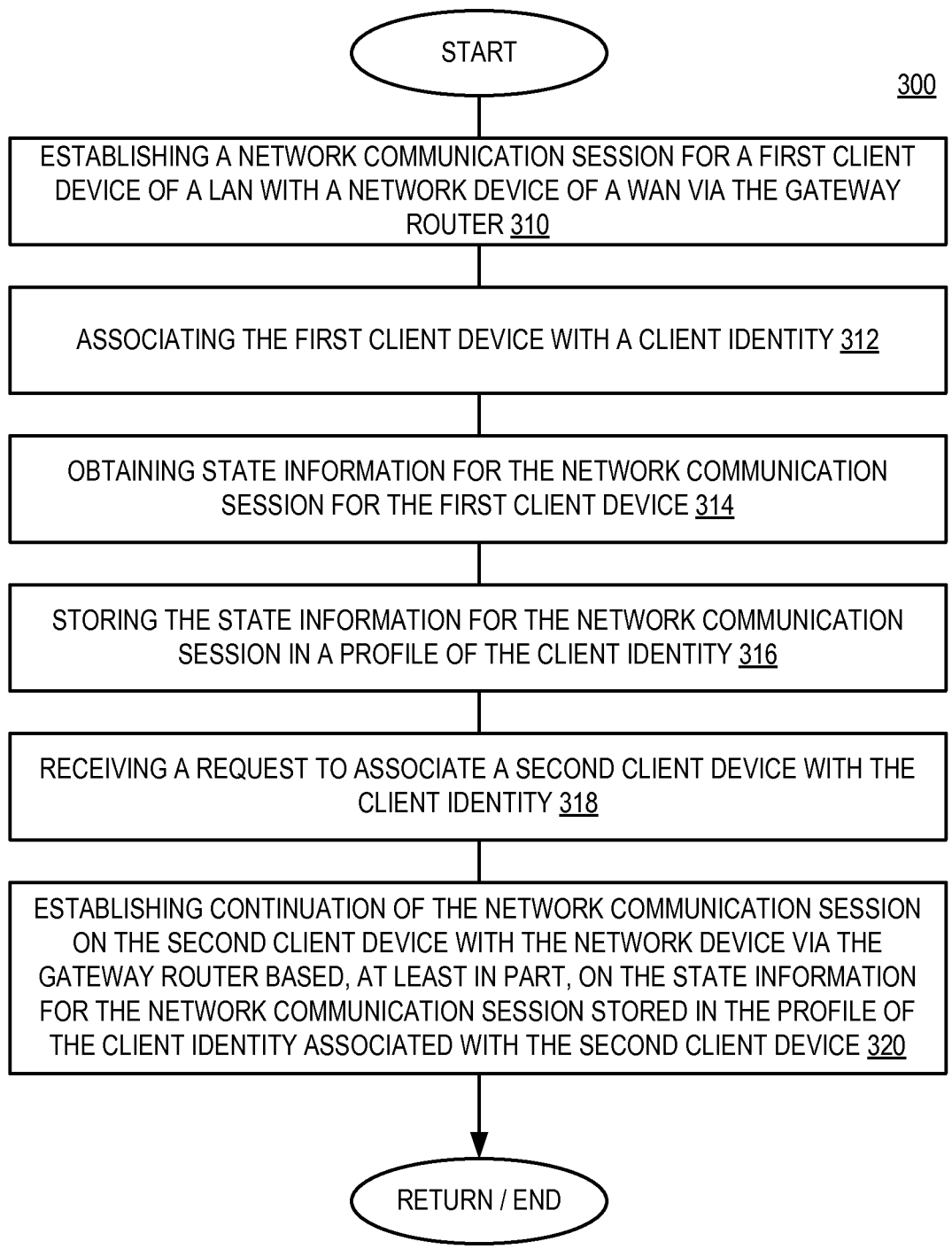
FIG. 3 is a flow diagram depicting an example method for a gateway router in which a network communications session is continued from a first client device to a second client device according to one disclosed embodiment.

FIG. 3 is a flow diagram depicting an example method 300 for a gateway router according to one disclosed embodiment. Method 300 may be performed to achieve a session hand-off between two or more client devices of a LAN via the gateway router. The session hand-off may include a network communications session or an application program session. As one example, method 300 may be performed by previously described gateway router 110 of FIG. 1.

At 310, the method may include establishing a network communications session for a first client device of a LAN with a network device of a WAN via the gateway router. As one example, the network communications session may include communications between software components at the transport layer, which is Layer 4 according to the Open Systems Interconnection (OSI) model. The network communications session may alternatively include an application program session at the application layer, or Layer 7 in the OSI model. Alternatively, other the network communications session may be at another layer, such as the network layer, or may be a combination of a network communications session and an application program session.

At 312, the method may include associating the first client device with a client identity. As previously described, the first client device may be associated with a client identity via a device identifier or by a user account of a user operating the first client device. For example, the client identity may include a collection of device identities corresponding to respective client devices. The collection may include a first device identifier defined, at least in part, by an identifier of the first client device, and a second device identifier defined, at least in part, by an identifier of a second client device.

As one example, the first client device may be associated with the client identity by storing a device identifier received from the first client device with the client identity at a storage device of the gateway router. As another example, the first client device may be associated with the client identity by sending an identifier received from the first client device to a network service accessible to the gateway router via the wide area network. The network service may be configured to store the identifier with the client identity at a remote storage device accessible to the network service.

Prior to or during the process of establishing a network communications session, a user may actively register the client identity with the gateway router (or a network service accessible to the gateway router via the WAN) by providing a device identifier of the first client device to the gateway router and/or by creating a user account at the gateway router that is portable across different client devices. In some implementations, the gateway router may register or passively detect the client identity by detecting a device identifier of the first client device and/or by passively detecting a user account of the user without requiring that the user actively register with the gateway router. As one example, an operating system of a client device may require that a user log-in to a user account of the operating system. User credentials provided by the user for logging-in to the user account of the operating system may be authenticated by the client device, and an indication of the authentication may be sent to the gateway router to also authenticate the user at the gateway router.

At 314, the method may include obtaining state information for the network communications session for the first client device. As one example, the state information may be obtained at an application layer (Layer 7) of a network communications session in the OSI model. For example, the gateway router may obtain and store browser cookies or web cookies sent between the client device and a network device of the WAN. As another example, application programs at the client device may report their state to the gateway router via an application program interface (API).

In some implementations, the state information for the network communications session may be obtained by the gateway router passively monitoring communications between the first client device and a network device of the WAN without terminating the communications. In some implementations, the state information for the network communications session may be obtained by the gateway router serving as a proxy for communications between the first client device and a network device of the WAN. In this implementation, the gateway router may terminate connections for communications between clients and the network device of the WAN.

At 316, the method may include storing the state information for the network communications session in a profile of the client identity. As one example, the state information may be stored in the profile at a storage device of the gateway router. Additionally or alternatively, the state information may be stored in the profile of the client identity by the gateway router sending the state information to a network service accessible to the gateway router via the WAN. The network service may be configured to store the state information at a remote storage device accessible to the network service. This approach may be referred to as "cloud" based storage.

At 318, the method may include receiving a request to associate a second client device with the client identity. In some implementations, the request to associate the second client device with the client identity may be received from the first client device. As one example, the request may take the form of a permission for the second client device to access the state information for the client identity. As another example, the request may take the form of a request to add or associate a device identifier of the second client device to the client identity. The gateway server may associate the second client device with the client identity responsive to the request.

In some implementations, the request to associate the second client device with the client identity may be received from the second client device. The gateway router may be configured to associate the second client device with the client identity based on the permissions set at the client identity. Alternatively, the gateway router may be configured to forward the request to the first client device responsive to receiving the request from the second client device. The gateway router may receive a response (e.g., as a permission) from the first client device confirming or denying the forwarded request. The gateway router may be configured to associate the second client device with the client identity if the response from the first client device confirms the forwarded request, and may be configured to deny association of the second client device with the client identity if the response from the first client device denies the forwarded request.

As yet another example, the request to associate the second client device with the client identity may be received from the second client device as user credentials. The gateway router may be configured to authenticate the user credentials of the request received from the second client device against user credentials of a user account of the client identity or of a user account permitted to access the profile by permissions. The gateway server may be configured to associate the second client device with the client identity if the user credentials are authenticated against the user credentials of the client identity or of a user account of the permissions, and may be configured to deny association of the second client device with the client identity if the user credentials are not authenticated against the user credentials of the client identity or of the permissions.

The second client device may be associated with the client identity using a similar approach described with respect to the first client device. As one example, the second client device may be associated with the client identity by storing a device identifier received from the second client device with the client identity at a storage device of the gateway router. As another example, the second client device may be associated with the client identity by sending an identifier received from the second client device to a network service accessible to the gateway router via the wide area network. The network service may be configured to store the identifier with the client identity at a remote storage device accessible to the network service.

At 320, the method may include establishing continuation of the network communications session on the second client device with the network device of the WAN via the gateway router based, at least in part, on the state information for the network communications session stored in the profile of the client identity associated with the second client device. For example, the state information may include a browser cookie or web cookie, or other suitable data resource from which session state may be identified.

As previously described, multiple devices owned or controlled by a user of the LAN may be registered with the gateway router. When a user uses a browser program of a first client, the state information (e.g., browser session state and cookies) for that user are saved at the gateway router. If, for example, the user discontinues or sets down a first client device with a set of browser windows open in multiple tabs, the state of those tabs may be saved at the gateway router. When the user connects to the gateway router with a second client device and launches the browser, the gateway router communicates the same tabs to the second client device, and coordinates cookie proxying so that the cookies are transmitted to the second device. Thus, a user browsing a webpage for products on a first client device wouldn't necessarily be required to re-login with a username and/or password on the second client device in order to purchase the products via the second device. Instead, the user could push a button, browse to the gateway router to pick up, or just be configured to "continue sessions". Some or all of the states of the browser windows may be accessible on any client device. A user watching a broadcast television stream on a first display device wouldn't be required to remember the address/channel when picking up the same stream at a different display device. If the cookies have saved the user's state, the user is enabled by the gateway router to resume at the same place the user left off at via the client second device.

As another example, software applications or application programs operating at client devices may maintain state across the client devices via the gateway router. While the applications may not necessarily speak HTTP or other specified communications protocol, the applications may access APIs on the gateway router that enables different client devices to report their state to the gateway router. The applications may access the state of other client devices. A collection of such APIs in a gateway router may provide an operating system for a home or business, where each client device may be a registered, trusted device, used by an authorized user, and may be integrated with other client devices of the user or associated with each other via the gateway router. A seamless user experience may be achieved online and in media consumption across client devices even with the reality of device proliferation. One example of such an API of the gateway router is described in FIG. 7.

Figure 4:
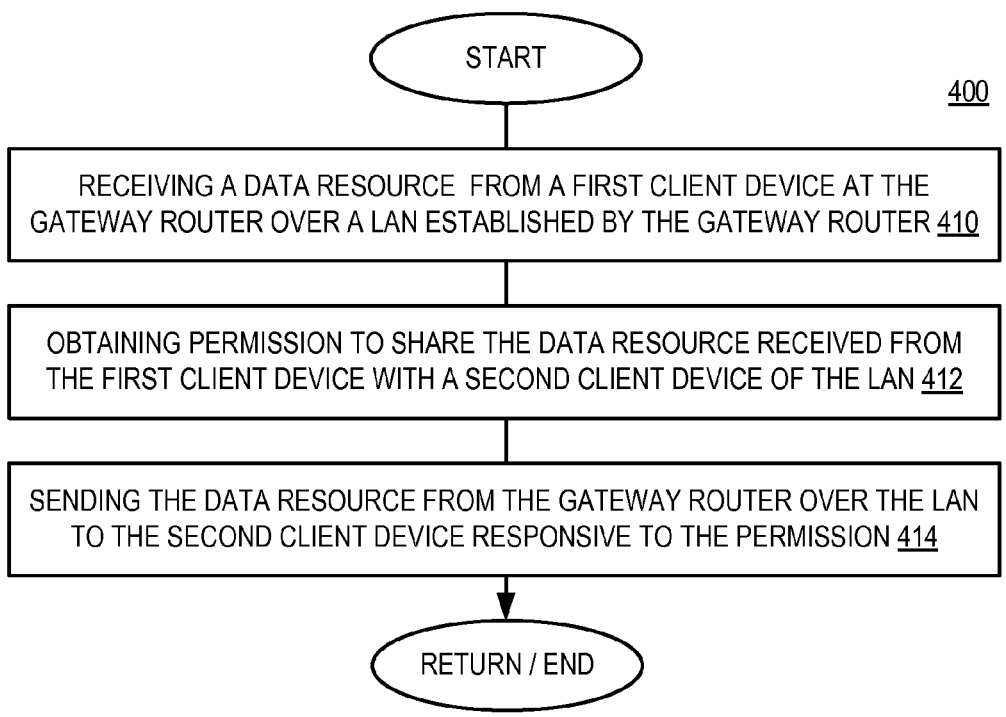
FIG. 4 is a flow diagram depicting an example method for a gateway router in which a data resource at a first client device is shared with a second client device according to one disclosed embodiment.

FIG. 4 is a flow diagram depicting an example method 400 for a gateway router according to one disclosed embodiment. Method 400 may be performed to achieve a data transfer between two or more client devices of a LAN via the gateway router. As one example, method 400 may be performed by previously described gateway router 110 of FIG. 1.

At 410, the method may include receiving a data resource from a first client device at the gateway router over a local area network established by the gateway router. A data resource may include a file, a hyperlink, a URL or URI, an application program or portion thereof, application session state information, network communications session state information, etc.

At 412, the method may include obtaining permission to share the data resource received from the first client device with a second client device of the LAN. In some implementations, the permission may be obtained from the first client device or from a client identity stored at the gateway router with which the first client device is associated. For example, a request for the data resource may be received at the gateway router from the second client device. The gateway router may forward the request to the first client device, and receive the permission from the first client device as a response to the forwarded request.

In some implementations, the permission may be obtained from the second client device or from the client identity stored at the gateway router with which both the first and the second client device is associated. For example, the permission may be received or authenticated at the gateway router from the second client device in the form of user credentials. The gateway router may authenticate the user credentials against access control information for the data resource stored in a client identity at the gateway router.

In some implementations, the data resource (e.g., file) may be stored in or associated with a profile of a client identity at a storage device of the gateway router. The profile may correspond to a profile associated with the second client device or the first client device (e.g., in a scenario involving a transfer between different client identities), or both the first and second client devices (e.g., in a scenario involving a transfer between client devices within the same client identity).

At 414, the method may include sending the data resource from the gateway router over the LAN to the second client device responsive to the permission. If permitted by permissions set by a client identity associated with the first client device, the gateway router sends the data resource from the gateway router to the second client device by retrieving the data resource from a storage device of the gateway router responsive to a request received from the second client device for the data resource. As one example, the request received from the second client device may include a request to access the contents of an inbox or other data repository.

Figure 5:
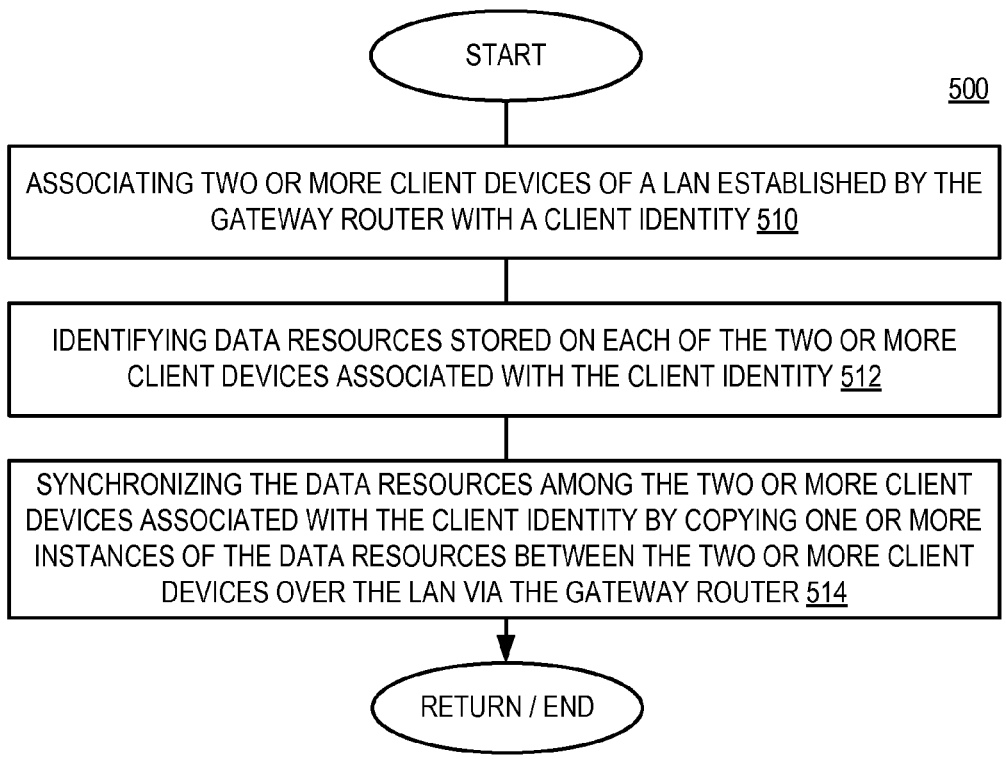
FIG. 5 is a flow diagram depicting an example method for a gateway router in which data resources are synchronized among multiple client devices according to one disclosed embodiment.

FIG. 5 is a flow diagram depicting an example method 500 for a gateway router according to one disclosed embodiment. Method 500 may be performed to synchronize content among two or more client devices of a LAN via the gateway router. As one example, method 500 may be performed by previously described gateway router 110 of FIG. 1.

In some implementations, the gateway router may enable data syncing between client devices sharing a profile of a client identity. For example, a first client device may belong to a user, and may have a number of applications, media content, and session state information stored thereon. The user may purchase or otherwise acquire a second client device, and may then configure the second client device with the applications, media content, and session state information of the first client device via the gateway router.

At 510, the method may include associating two or more client devices of a LAN established by the gateway router with a client identity. As previously described, the two or more client devices may be associated with a client identity as permissions to access aspects of the profile of the client identity or as members of the client identity (e.g., owned by the same user). At 512, the method may include identifying data resources stored on each of the two or more client devices associated with the client identity. For example, the gateway router may poll client devices of the LAN to identify data resources stored at each client device. The gateway router may maintain an index (e.g., a file index, an application index, etc.) of the data resources of each client device. The index may be stored in a profile associated with a client identity.

At 514, the method may include synchronizing the data resources among the two or more client devices associated with the client identity by copying one or more instances of the data resources between the two or more client devices over the local area network via the gateway router. Synchronization may be performed by the gateway router responsive to a request by one of the client devices associated with the client identity, or automatically responsive to identification of a data resource stored on one client device of the client identity not present on another client device of the client identity.

Figure 6:
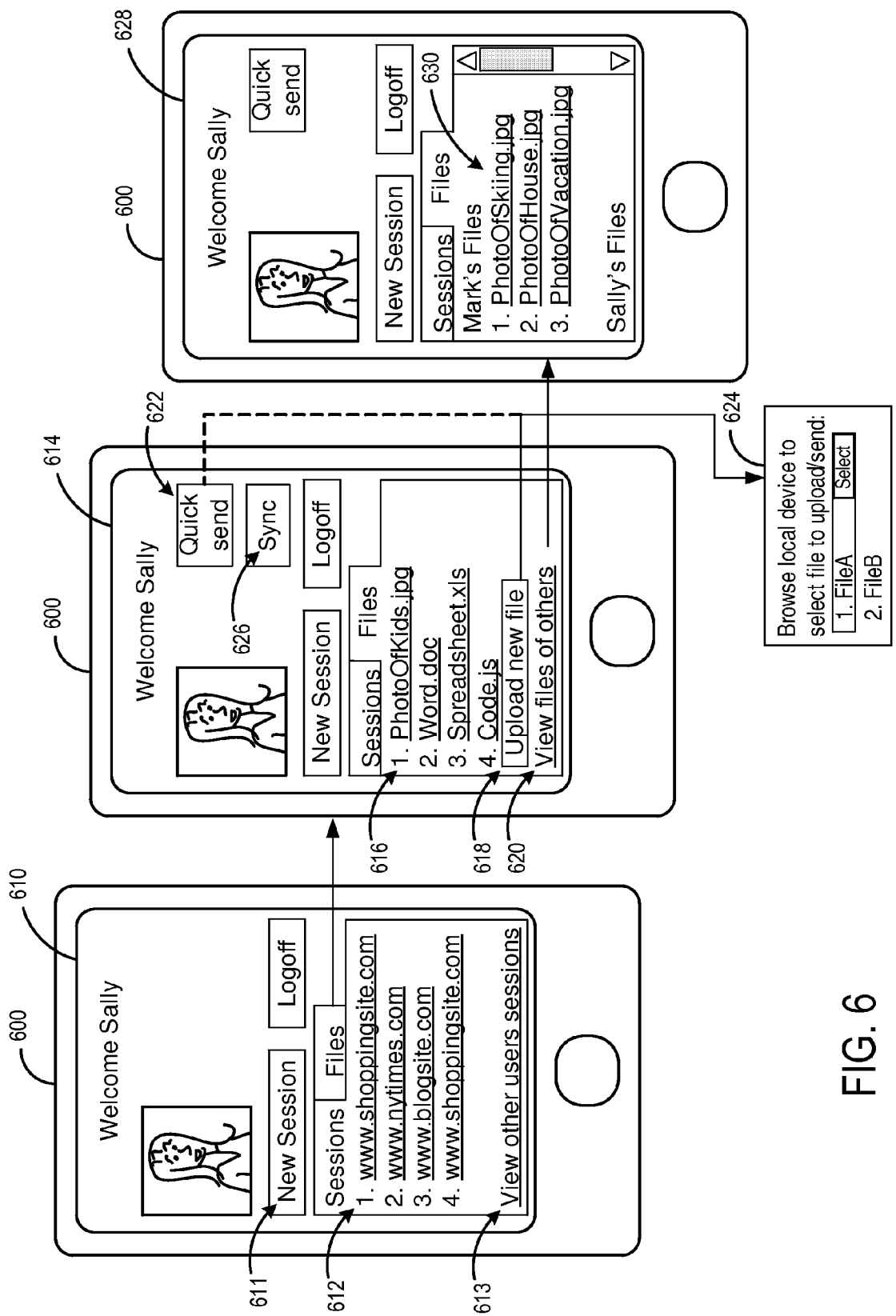
FIG. 6 is a schematic diagram depicting an example sequence of graphical user interfaces according to one disclosed embodiment.

FIG. 6 is a schematic diagram depicting an example sequence of graphical user interfaces (GUIs) according to one disclosed embodiment. Information presented via these GUIs may be served or otherwise sent to client devices of a LAN by the gateway router. These GUIs may be used to manage session hand-off and/or sharing of data resources among two or more client devices associated with a common client identity, or between two or more different client identities corresponding to different user accounts and/or different device identities according to permissions. These GUIs may provide users with an interface to the gateway router via their respective client devices.

Client device 600 is shown presenting graphical user interface (GUI) 610. An example user (e.g., Sally) may, for example, log-in to a gateway router interface presented as a GUI via client device 600 to access information stored in a profile of the client identity at the gateway router. As one example, user Sally may be represented by a client identity that takes the form of a user account. For example, user Sally may access a user account by providing user credentials (e.g., username and/or password) to the gateway router via client device 600. As another example, user Sally may be represented by a client identity that takes the form of a device identifier of client device 610 through which user Sally accesses the gateway router.

GUI 610 includes an existing sessions list 612. Sessions list 612 may be presented as a selectable "Sessions" tab as depicted, for example, in FIG. 6. Sessions list 612 provides an indication of existing network communications sessions associated with the client identity. For example, the client identity may have previously established network communications sessions via client device 600 or another client device associated with the client identity. Accordingly, these network communications sessions may have been previously established between client device 600 (or another client device associated with the client identity) and a network device of the WAN. Sessions list 612 may include one or more selectors (e.g., links) that indicate the existing network communications sessions available to the user. The existing network communications sessions may be represented by one or more Uniform Resource Locators (URLs) or other suitable Uniform Resource Identifiers (URIs).

User Sally may continue an existing network communications session from client device 600 by selecting a corresponding selector indicating an existing network communications session from sessions list 612. For example, responsive to selection of a network communications session from session list 612, the gateway router may establish continuation of the network communications session for client device 600 with a network device of the WAN based, at least in part, on state information stored in a profile of the client identity. User Sally may establish a new communications session, for example, by selecting selector 611 (e.g., "New Session").

GUI 610 further includes a selector 613 (e.g., "View other user's sessions") that enables a user to view network communications sessions of other client identities or user accounts. For example, another client identity (e.g., user Mark) may have granted the client identity (e.g., user Sally) permission to view and/or access network communications sessions of user Mark. User Mark's sessions list may be presented in a similar format to previously described sessions list 612. For example, user Sally may continue an existing communications session initially established by user Mark by selecting the communications session from user Mark's session list. User Sally may similarly manage permissions via the gateway router to enable other client identities (e.g., user Mark) to view and/or access existing network communications sessions established by user Sally.

GUI 614 includes a files list 616. Files list 616 may be presented as a selectable "Files" tab as depicted, for example, in FIG. 6. Files list 616 provides an indication of files associated with the client identity. For example, the client identity (e.g., user Sally) may have previously uploaded a file to the gateway router via client device 600 or another client device associated with the client identity. Files list 616 may include one or more selectors (e.g., links) that indicate the files associated with the client identity. These files may include, for example, image files (e.g., .jpg), word processing files (e.g., .doc, .xls, etc.), instructions set files (e.g., .js), among other suitable file types. A user may navigate between GUI 610 and GUI 614. For example, selection of "Files" tab in GUI 610 by the user causes the gateway router to send information to client device 600 to present GUI 614, which includes a list of files 616.

GUI 614 further includes a selector 618 (e.g., "Upload new file"), which enables user Sally to upload a new file from client device 600 to the gateway router via the LAN. The uploaded file may be associated with the client identity (representing user Sally as a user account and/or client device 600 as a device identifier) by the gateway router storing the uploaded file in the profile of the client identity. Files list 616 may be updated at GUI 614 to include the uploaded new file. GUI 624 provides an example of how a user may browse the contents of a storage device to select a file located at client device 600 to be uploaded to the gateway router. The gateway router may cause the client device to display a window of available data resources by which the user may select a data resource (e.g., a file) to send to the other client profile, client device, or user account.

GUI 614 further includes a selector 622 (e.g., "Quick send"), which enables user Sally to send a file to another client identity (e.g., another user represented by a user account and/or another client device represented by a device identifier). Responsive to selection of selector 622, files that are sent to another client profile associated with a target client identity may be stored in the client profile of the target client identity at the gateway router where the files may be retrieved by the target client identity (e.g., user or client device) associated with the target client profile. Alternatively, the file may be sent (e.g., pushed) to a user or client device associated with the target client identity via email, SMS, or other suitable communications format.

GUI 614 further includes a selector 626 (e.g., "Sync"), which enables user Sally to synchronize files across two or more client devices associated with her user account as previously described, for example, with reference to FIG. 4. For example, user Sally may transfer data, including files, applications, session state information, etc. among her client devices via the gateway router to update the data resources at each client device.

GUI 614 further includes a selector 620 (e.g., "view files of others") that enables a user to view and/or access files of other client identities. For example, another client identity (e.g., user Mark) may have granted the client identity (e.g., user Sally) with permission to view and/or access files of user Mark. User Mark's files list may be presented in a similar format to previously described files list 616. For example, GUI 628 includes a files list 630 for user Mark's files available to user Sally. User Sally may manage permissions via the gateway router to enable other client identities (e.g., user Mark) to view and/or access files uploaded to the gateway router by user Sally.

The GUIs of FIG. 6 may be accessed by users via a special purpose application program dedicated to controlling and managing the gateway router, or via a multi-purpose application program such as web browser or file browser. For example, these GUIs may be presented in a webpage viewing region of a browser, or in a menu system of the browser. As yet another example, the GUIs of FIG. 6 may be presented in a menu system or task bar of an operating system of a client device.

Figure 7:
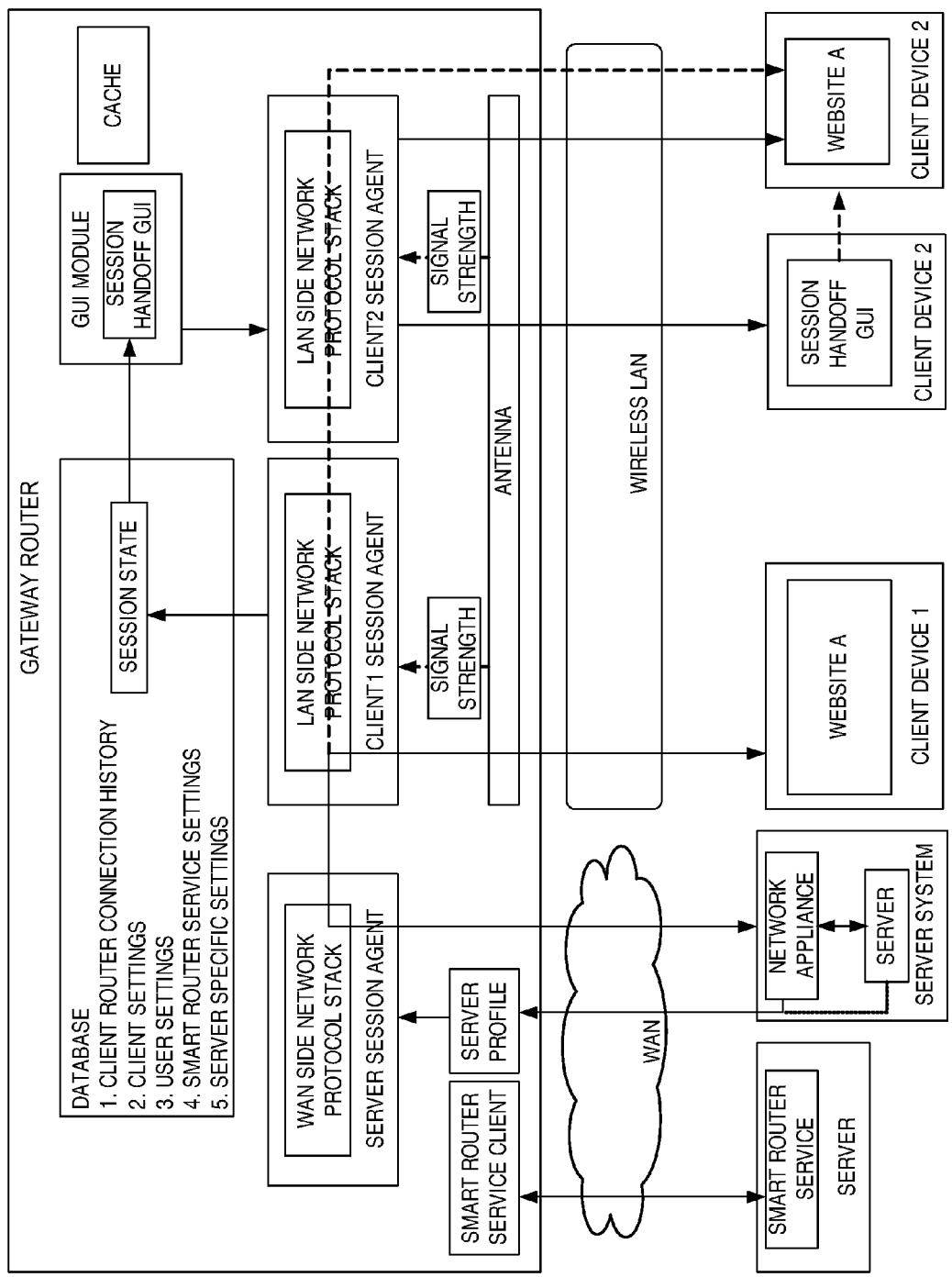
FIG. 7 is a schematic diagram depicting additional aspects of a gateway router, including an application programming interface according to one disclosed embodiment.

FIG. 7 is a schematic diagram depicting additional aspects of a gateway router, including an application programming interface according to one disclosed embodiment. The gateway router of FIG. 7 may correspond to previously described gateway router 110 of FIG. 1, as FIG. 7 provides a non-limiting use scenario of computing system 100. In FIG. 7, an application program or OS component on each client device communicates with an API on the gateway router, such as a file storage API, session handoff API, store session state API, user login API, device authentication API, etc. The APIs may handle one or more of the previously described operations performed by the gateway router, such as storing a file, storing a session state, handing off a session, user log-in to the gateway router, or authenticating a client device or user to the gateway router. Other APIs may also be provided, such as device data sync API, for example. The APIs may also in some instances interact with cloud services of the WAN by communicating with a server and/or network appliance of a server system via the WAN. For example, a file may be stored locally at the gateway router and may be also backed up in a cloud based storage location accessible to the gateway router. As another example, the APIs may also communicate via a gateway router service client on the gateway router with a gateway router service across the WAN, and send/retrieve gateway router client identity profile data, etc. that may be used for user account log-in, for example. Various other APIs may be provided to provide enhanced functionality directly from the gateway router and/or from the gateway router combined with cloud based servers.

The example GUIs of FIG. 6 may be accessed by users in a number of ways, such as the through one or more of the previously described APIs. As one example, a user may navigate a client device to a well-known URI, or capture DNS. As another example, a user may enter a URL or URI (e.g., such as a malformed, but easy to remember URI) in a browser address bar (e.g., such as "ROUTER" or "SHARE"). The gateway router may be configured to intercept the DNS query and interpret the query as a SHARE command. In response to the SHARE command, the gateway router may be configured to serve a SHARE interface (e.g., one or more of the GUIs of FIG. 6) back to the client device that enables the user to share information with another user and/or client device of the LAN.

In some implementations, the gateway router can be configured to listen for commands, and serve GUIs in response to requests (e.g., the SHARE request) from a client device. For example, the gateway router may be associated with a number of functions, such as "SHARE", "SETTINGS", "PICKUP SESSION", etc. Each function may cause the gateway router to return a different functional interface to the client device or another client device of the LAN to be displayed to a user. For example, the SHARE GUI may include a list of other connected client devices, enabling a user to select a client device or user with which to share a data resource such as a hyperlink. The gateway router may be configured to insert a notification for destination users in a communication stream to enable sessions to be selectively maintained by the destination user. This feature may be implemented as browser buttons, selectors, or controls, for example.

Figure 8:
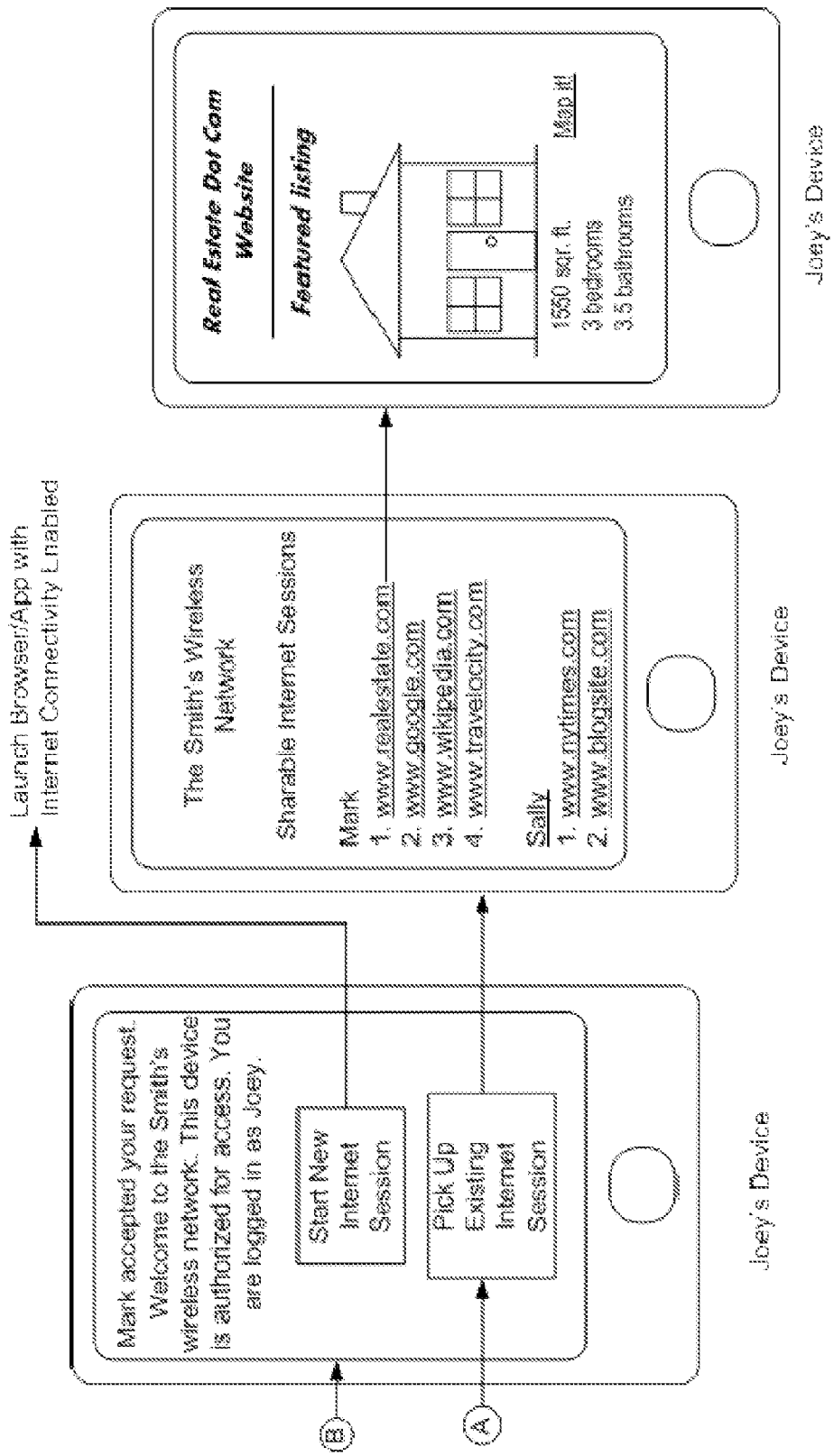
FIG. 8 illustrates an example user account log-in interface for a gateway router according to one disclosed embodiment.
Figure 9:
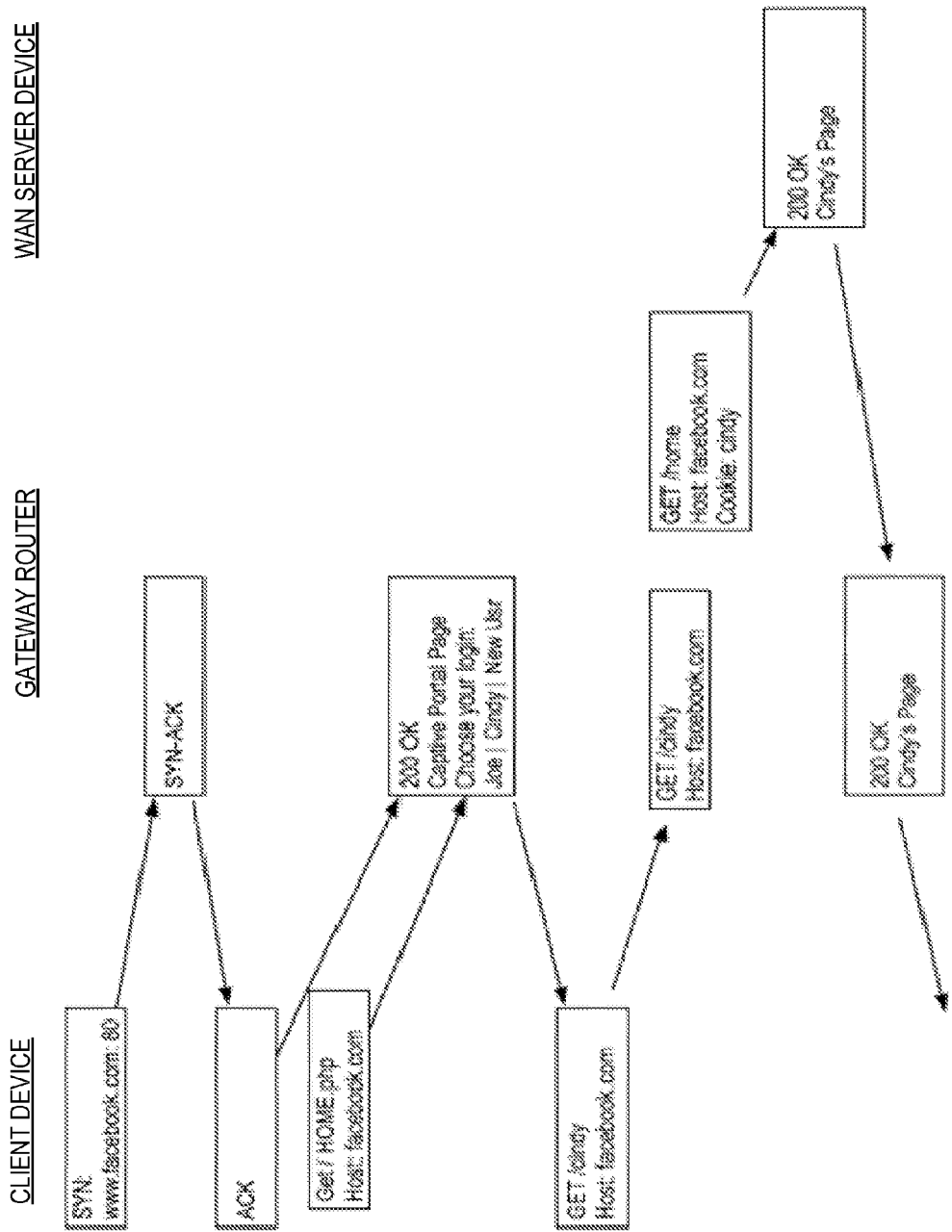
FIG. 9 illustrates an example communication flow between a client device, a gateway router, and a server device of a WAN according to one disclosed embodiment.

FIG. 8 depicts an example by which the gateway router may present a user account log-in interface. When a client device/user accesses the gateway router for example by attempting to send a request to access a resource at a destination server on the WAN, the gateway router modifies the request and presents a log-in interface to the requesting client device instead of immediately forwarding the request on to the destination server. FIG. 9 illustrates an example communication flow between a client device, the gateway router, and a server device of the WAN used to present the captive portal page for log-in to the gateway router.

It will be appreciated that according to the communication flow of FIG. 9, when a user starts a new browsing session from a new client device, or from a registered client device after a period of registered device inactivity, the gateway router may be configured to intercept the request, and prompt the user for the user credentials of the user account, and then passes the request and appropriate set of cookies to the destination website responsive to authentication of the user credentials.

The captive portal page with log-in interface can also function as way to switch between authorized users on registered client devices and to access existing user sessions. Those users may be prompted to acknowledge the existing sessions (e.g., "tap-to-continue") or may be required input additional user credentials. One example of a user credentials selection interface is illustrated in FIG. 8. Upon selection of an appropriate username, which may be password/biometrically protected if desired, a customized menu may served by the gateway router to the requesting client device showing cached sessions for the user from sessions initiated by the user on all client devices of the user's client identity that have connected through the gateway router. The user can then select to view an existing session, in which case the state of the cached webpage will be displayed, and cookies downloaded to the requesting device, so that any subsequent requests from that webpage will properly be sent to the network server of the WAN through the gateway router.

Figure 10:
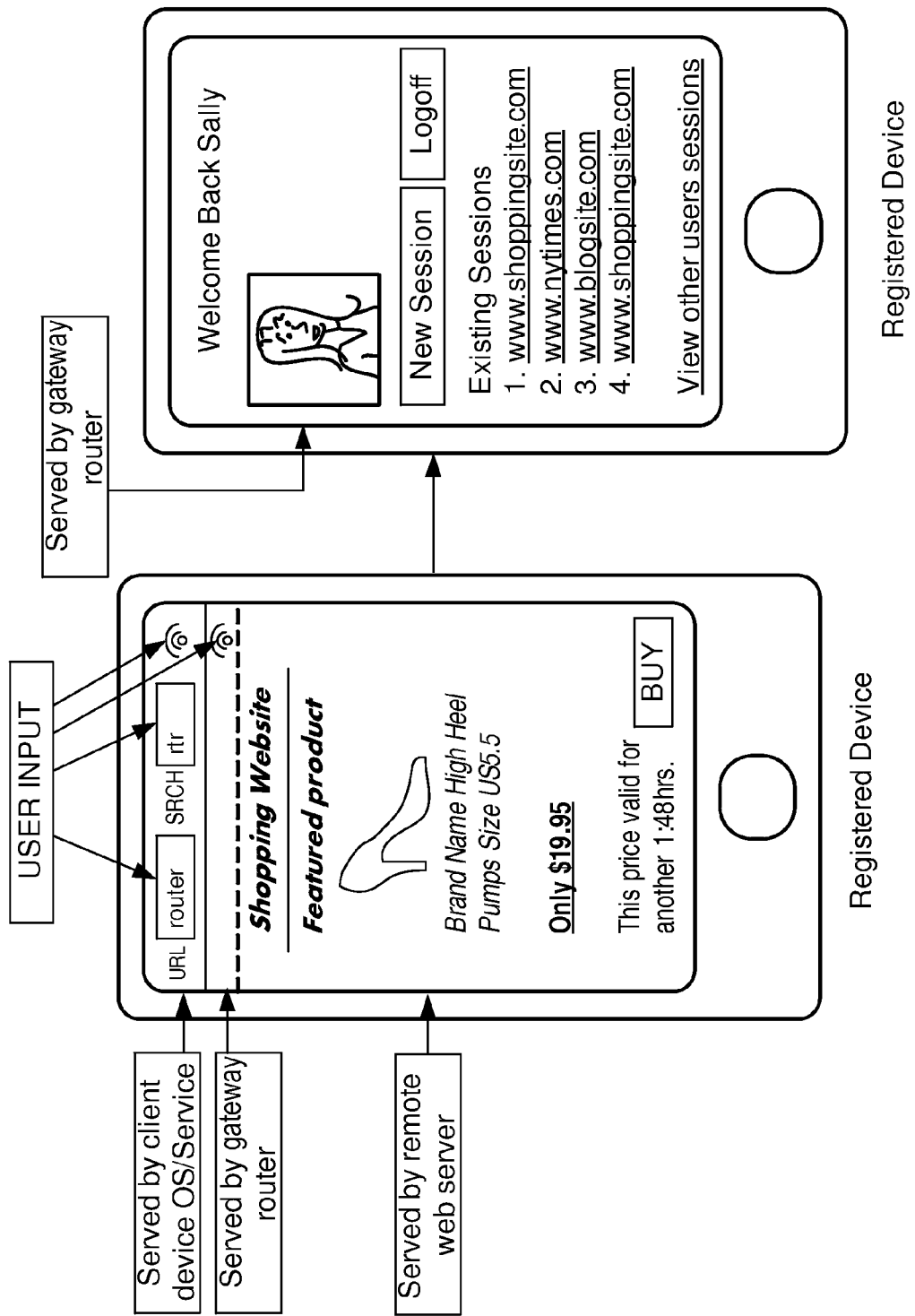
FIG. 10 illustrates an example router interface for users to access a gateway router according to one disclosed embodiment.

Once a user is registered, the gateway router may also provide a router interface for users to access the gateway router to logoff from the existing user session, or to access other existing sessions of other client identities. FIG. 10 illustrates an example of such an interface, and various alternative mechanisms for accessing the interface. Generally, it is preferable for the gateway router interface to be as unobtrusive as possible during the user browsing experience, but accessible when needed. To that end, the gateway router may be configured to receive search bar entries, or address bar entries, that, when they contain a matching term, such as "router" or "rtr", for example, cause the gateway router to not send the search request or DNS query on to a remote server/DNS server. Rather, the gateway router may be configured to "eat" these requests and in response display the interface shown at the right in FIG. 10, which includes various links to access existing sessions. In addition, a dedicated router interface selector icon may be provided proximate the address field/search field in the address/search bar. Selection of the icon may be configured to cause the interface at the right in FIG. 10 to be displayed. This bar, may be served by native programs on the client device, and may be scrolled in from off screen by a user to be unobtrusive. Alternatively or in addition, the gateway router may be configured to insert code into the web page code received from a network device of the WAN, to cause a router interface selector to be displayed in a dedicated field proximate the web page, or within the web page itself. This dedicated field may be transparent until tapped/mouse-over, or could "fly in" or scroll in from off screen when tapped/mouse-over, so as to be as unobtrusive as possible.

It should be understood that the embodiments herein are illustrative and not restrictive, since the scope of the invention is defined by the appended claims rather than by the description preceding them. All changes that fall within metes and bounds of the claims or equivalence of such metes and bounds thereof are therefore intended to be embraced by the claims.

The invention claimed is:

1. A method for a gateway router, the method comprising:
   establishing a network communications session in the Open Systems Interconnection (OSI) model for a first client device of a wireless local area network with a network device of a wide area network via the gateway router, the gateway router positioned at a boundary between the wireless local area network and the wide area network;
   associating the first client device with a client identity;
   obtaining state information at an application layer (Layer 7) in the OSI model for the network communications session for the first client device, the state information including a browser cookie or a web cookie communicated between the first client device and the network device via the gateway router during the network communications session;
   storing the state information for the network communications session in a profile of the client identity;
   receiving a grant of permission for a second client device of the wireless local area network to access the state information stored in the profile of the client identity;
   receiving web page code of a web page served by another network device of the wide area network;
   inserting dedicated router interface code in the web page code to include a dedicated router interface along with the web page;
   serving the web page code with the inserted dedicated router interface code to the second client device via the wireless local area network to cause the web page and the dedicated router interface to be displayed at the second client device with the dedicated router interface proximate the web page or with the web page;
   receiving a first user input via the second client device over the wireless local area network, the first user input directed at a router interface selector of the dedicated router interface;
   responsive to the first user input, serving one or more user interfaces to the second client device via the wireless local area network, the one or more user interfaces including one or more additional selector to access the network communications session of the first client device based on the grant of permission;
   receiving one or more additional user inputs via the second client device over the wireless local area network, the one or more additional user inputs directed at the one or more additional selectors indicating selection of the network communications session of the first client device;
   and responsive to the one or more additional user inputs, establishing continuation of the network communications session of the second client device of the wireless local area network with the network device via the gateway router based, at least in part, on the state information for the network communications session stored in the profile of the client identity.

2. The method of claim 1, wherein associating the first client device with the client identity includes:
   storing an identifier received from the first client device with the client identity at a storage device of the gateway router.

3. The method of claim 1, wherein associating the first client device with the client identity further includes:
   sending an identifier received from the first client device to a network service accessible to the gateway router via the wide area network, the network service configured to store the identifier with the client identity at a remote storage device accessible to the network service.

4. The method of claim 1, wherein the client identity includes a user account having user credentials for authenticating access to the state information.

5. The method of claim 1, wherein the client identity includes a collection of device identities, the collection including:
   a first device identifier defined, at least in part, by an identifier of the first client device, and
   a second device identifier defined, at least in part, by an identifier of the second client device.

6. The method of claim 1, wherein obtaining the state information for the network communications session for the first client device includes:
   passively monitoring communications between the first client device and the network device without terminating the connections for the communications; or
   proxying communications between the first client device and the network device by terminating connections for the communications.

7. The method of claim 1, wherein storing the state information for the network communications session in the profile of the client identity includes:
   storing the state information at a storage device of the gateway router; and/or
   sending the state information to a network service accessible to the gateway router via the wide area network, the network service configured to store the state information at a remote storage device accessible to the network service.

8. The method of claim 1, wherein receiving the grant of permission for the second client device to access the state information includes receiving a request from the first client device; and wherein the method further comprises:
   associating the second client device with the client identity responsive to the request.

9. The method of claim 1, wherein receiving the grant of permission for the second client device to access the state information includes receiving a request from the second client device; and wherein the method further comprises:
   forwarding the request to the first client device responsive to receiving the request from the second client device;
   receiving a response from the first client device confirming or denying the forwarded request;
   associating the second client device with the client identity if the response from the first client device confirms the forwarded request; and
   denying association of the second client device with the client identity if the response from the first client device denies the forwarded request.

10. The method of claim 1, wherein receiving the grant of permission for the second client device to access the state information includes receiving a request from the second client device, the request including user credentials; and wherein the method further comprises:
   authenticating the user credentials of the request received from the second client device against user credentials in the profile of the client identity;
   associating the second client device with the client identity if the user credentials of the request are authenticated against the user credentials in the profile of the client identity; and denying association of the second client device with the client identity if the user credentials of the request are not authenticated against the user credentials in the profile of the client identity.

11. A gateway router, comprising:
a processor;
a storage device having instructions stored thereon executable by the processor to:
establish a network communications session in the Open System Interconnection (OSI) model for a first client device of a wireless local area network with a network device of wide area network via the gateway router, the gateway router positioned at a boundary between the wireless local area network and the wide area network;
associate the first client device with a client identity;
obtain state information at an application layer (Layer 7) in the OSI model for the network communications session for the first client device, the state information including a browser cookie of a web cookie communicated between the first client device and the network device via the gateway router during the network communications session;
store the state information for the network communications session of the client identity;
receive a grant of permission for a second client device of the wireless local area network to access the state information stored in the profile of the client identity;
receive web page code of a web page served by another network device of the wide area network;
insert dedicated router interface code into the web page code to include dedicated router interface along with the web page;
server the web page code with the inserted dedicated router interface code to the second client device via the wireless local area network to cause the web page and the dedicated router interface to be displayed at the second client device with the dedicated router interface proximate the web page or within the web page;
receive a first user input via the second client device over the wireless local area network, the first user input directed at a router interface selector of the dedicated router interface;
responsive to the first user input, serve one or more user interface to the second client device via the wireless local area network, the one or more user interfaces including one or more additional selectors to access the network communications session of the first client device based on the grant of permission;
receive one or more additional user inputs via the second client device over the wireless local area network, the one or more additional user inputs directed at the one or more additional selectors indicating selection of the network communications session of the first client device;
responsive to the one or more additional user inputs, establish continuation of the network communications session on the second client device of the wireless local area network with the network device via the gateway router based, at least in part, on the state information for the network communications session stored in the profile of the client identity.

12. The gateway router of claim 11, wherein the instructions are further executable by the processor to:
associate the first client device with the client identity by storing an identifier received from the first client device with the client identity at the storage device of the gateway router.

13. The gateway router of claim 11, wherein the instructions are further executable by the processor to:
associate the first client device with the client identity by sending an identifier received from the first client device to a network service accessible to the gateway router via the wide area network, the network service configured to store the identifier with the client identity at a remote storage device accessible to the network service.

14. The gateway router of claim 11, wherein the client identity includes a user account having user credentials for authenticating access to the state information.

15. The gateway router of claim 11, wherein the client identity includes a collection of device identities, the collection including:
a first device identifier defined, at least in part, by an identifier of the first client device, and
a second device identifier defined, at least in part, by an identifier of the second client device.

16. The gateway router of claim 11, wherein the instructions are further executable by the processor to:
obtain the state information for the network communications session for the first client device by:
passively monitoring communications between the first client device and the network device without terminating the connections for the communications, or
proxying communications between the first client device and the network device by terminating connections for the communications.

17. The gateway router of claim 11, wherein the instructions are further executable by the processor to:
store the state information for the network communications session in the profile of the client identity by:
storing the state information at the storage device of the gateway router, and/or
sending the state information to a network service accessible to the gateway router via the wide area network, the network service configured to store the state information at a remote storage device accessible to the network service.

18. The gateway router of claim 11, wherein the instructions are further executable by the processor to:
receive the grant of permission for the second client device to access the state information by receiving a request from the first client device; and
associate the second client device with the client identity responsive to the request.

19. The gateway router of claim 11, wherein the instructions are further executable by the processor to:
receive the grant of permission for the second client device to access the state information by receiving a request from the second client device;
forward the request to the first client device responsive to receiving the request from the second client device;
receive a response from the first client device confirming or denying the forwarded request;
associate the second client device with the client identity if the response from the first client device confirms the forwarded request; and
deny association of the second client device with the client identity if the response from the first client device denies the forwarded request.

20. The gateway router of claim 11, wherein the instructions are further executable by the processor to:
- receive the grant of permission for the second client device to access the state information by receiving a request from the second client device, the request including user credentials;
- authenticate the user credentials of the request received from the second client device against user credentials in the profile of the client identity;
- associate the second client device with the client identity if the user credentials of the request are authenticated against the user credentials in the profile of the client identity; and
- deny association of the second client device with the client identity if the user credentials of the request are not authenticated against the user credentials in the profile of the client identity.

* * * * *